(12) United States Patent
Lopatin

(10) Patent No.: US 8,525,705 B1
(45) Date of Patent: Sep. 3, 2013

(54) APPARATUS AND METHOD FOR DETECTING DEFECTS IN SOLID ROCKET MOTOR PROPELLANT

(75) Inventor: Craig Michael Lopatin, Washington, DC (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 524 days.

(21) Appl. No.: 12/802,449

(22) Filed: May 20, 2010

(51) Int. Cl.
*H04B 14/00* (2006.01)

(52) U.S. Cl.
USPC ......... 340/999; 324/639; 324/637; 250/358.1

(58) Field of Classification Search
USPC .............. 324/534, 642, 639, 637; 250/358.1, 250/306; 60/255, 253, 251; 102/287
See application file for complete search history.

(56) References Cited

U.S. PATENT DOCUMENTS

| | | |
|---|---|---|
| 2,999,982 A | 9/1961 | Broussaud |
| 3,490,037 A | 1/1970 | Williams |
| 3,534,260 A | 10/1970 | Walker |
| 3,562,642 A | 2/1971 | Hochschild |
| 3,710,243 A | 1/1973 | Keenan |
| 3,810,005 A | 5/1974 | Bennion et al. |
| 4,123,703 A | 10/1978 | Robinson |
| 4,344,030 A | 8/1982 | Anderson et al. |
| 4,514,680 A | 4/1985 | Heikkila et al. |
| 4,821,511 A * | 4/1989 | Felix et al. ..................... 60/255 |
| 4,943,930 A | 7/1990 | Radjy |
| 5,024,091 A | 6/1991 | Pellerin |
| 5,384,543 A | 1/1995 | Bible et al. |
| 5,821,410 A | 10/1998 | Xiang et al. |
| 5,859,535 A * | 1/1999 | Liu ................................ 324/632 |
| 5,900,618 A | 5/1999 | Anlage et al. |
| 6,885,191 B1 * | 4/2005 | Gleman ......................... 324/300 |
| 6,968,730 B2 | 11/2005 | Schafrik et al. |
| 7,095,221 B2 | 8/2006 | Bosselmann et al. |
| 7,926,356 B1 * | 4/2011 | Lopatin .......................... 73/768 |
| 2002/0097180 A1 | 7/2002 | Geisheimer et al. |
| 2004/0065075 A1 * | 4/2004 | Peterson et al. ................ 60/253 |
| 2004/0226351 A1 | 11/2004 | Schafrik et al. |
| 2009/0176369 A1 * | 7/2009 | Nickel et al. .................. 438/687 |
| 2009/0179152 A1 * | 7/2009 | Ellison ....................... 250/358.1 |

* cited by examiner

*Primary Examiner* — Hai Phan
*Assistant Examiner* — Hongmin Fan
(74) *Attorney, Agent, or Firm* — Fredric T. Zimmerman

(57) ABSTRACT

A solid rocket motor having a liner surrounding a propellant includes an array of transmitter elements and receiver elements disposed within the liner. Transmitter electronics provide the transmitter elements with a transmit signal and receiver electronics receive the outputs of the receiver elements. The outputs are analyzed to determine any defects in the propellant.

8 Claims, 4 Drawing Sheets

APPARATUS AND METHOD FOR DETECTING DEFECTS IN SOLID ROCKET MOTOR PROPELLANT

STATEMENT OF GOVERNMENT INTEREST

The invention described herein may be manufactured and used by or for the Government of the United States of America for Governmental purposes without the payment of any royalties thereon or therefor.

FIELD OF THE INVENTION

The invention relates to testing apparatus and methods, and, in particular, to apparatus and methods for detecting defects in solid rocket motor propellant.

BACKGROUND OF THE INVENTION

Solid rocket motors may be utilized in weapons such as air-to-air and air-to-ground missiles, as well as in model rockets and boosters for satellite launchers. Air pockets within the propellant grain or fractures of the grain may produce an instantaneous increase in burn surface area. The increase in burn surface area may produce a corresponding increase in exhaust gas and pressure, which may result in a rupture of the casing containing the propellant.

Aging of the propellant may lead to significant degradation in weapon performance and catastrophic failure. Tactical missiles may be kept for extended periods of time and, accordingly, there is a dire need to know if there is any defect in the propellant prior to use.

An aging model may be used to predict and detect material degradation, given an assumed or measured environmental history. Other approaches may use non-destructive testing, such as ultrasound and X-rays. All of these approaches, as currently practiced, may be inadequate to meet the needs of a real-time self-sensing monitoring system for full-up rounds. In addition, the rounds may not be able to be examined in-situ, but must be removed from their storage location and brought to an examining machine.

In addition to the above approaches, other testing methods may include the use of embedded sensors, such as fiber optics or electrical strain gages. Drawbacks to these methods include fragility, difficulty in placement during manufacture, and the need for expensive and bulky interrogators.

SUMMARY OF THE INVENTION

It is an aspect of the invention to provide an apparatus that may image flaws in a solid rocket motor propellant in-situ, without moving the propellant from its storage location.

An apparatus for detecting defects in a solid rocket motor propellant contained within a rocket casing may include a liner disposed between the propellant and the casing. An array of radio frequency (RF) transmitter elements and RF receiver elements may be disposed within the liner and around the propellant. Transmitter electronics may be provided to supply the transmitter elements with a transmit signal, and receiver electronics may be provided to receive the transmitted signals. The output signals of the receiver elements may be analyzed by a microprocessor to determine if there are defects in the propellant.

A method of detecting defects in a solid rocket motor propellant contained within a rocket casing may include providing an array of RF transmitter elements and RF receiver elements disposed within a liner that surrounds the solid rocket motor propellant. The transmitter elements may transmit RF signals through the rocket motor propellant. The receiver elements may receive the RF signals. Defects in the solid rocket motor propellant may be detected by analyzing the received RF signals.

The invention will be better understood, and further objects, features and advantages thereof will become more apparent from the following description of the exemplary embodiment, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION OF THE INVENTION

Figure 1:
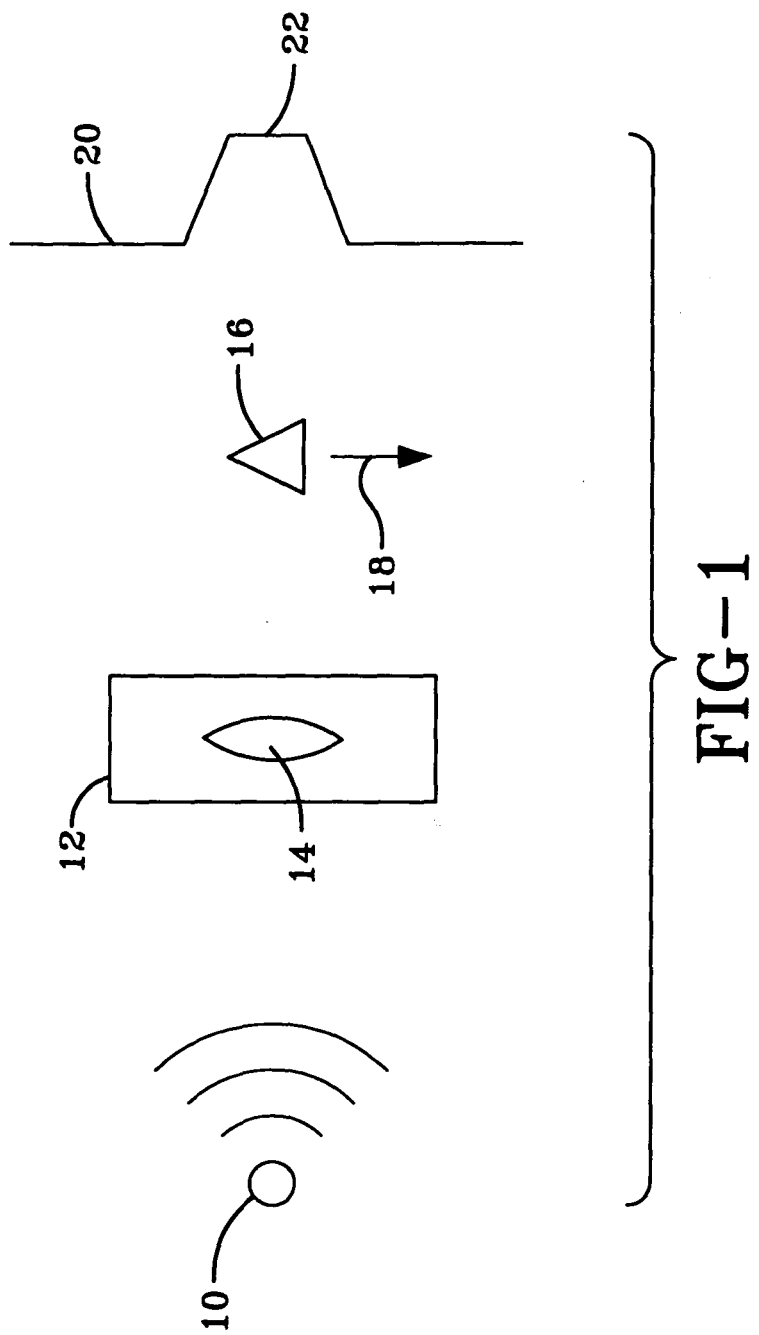
FIG. 1 illustrates the transmission of RF energy through a structure having a defect.

In the Figures, transmitter elements are shown as circles and receiver elements are shown as triangles. In FIG. 1, an RF transmitter element 10 projects RF energy through a structure 12 having an internal defect 14. On the other side of structure 12 a receiver element 16, moving in the direction of arrow 18, receives the projected RF energy and produces a corresponding output, indicated by waveform 20. As receiver element 16 scans past defect 14, there is an increase in receiver element output, as indicated by pulse 22. The invention may use an array of transmitter elements and an array of receiver elements to pinpoint, precisely, defects in the propellant of a solid rocket motor.

Figure 2:
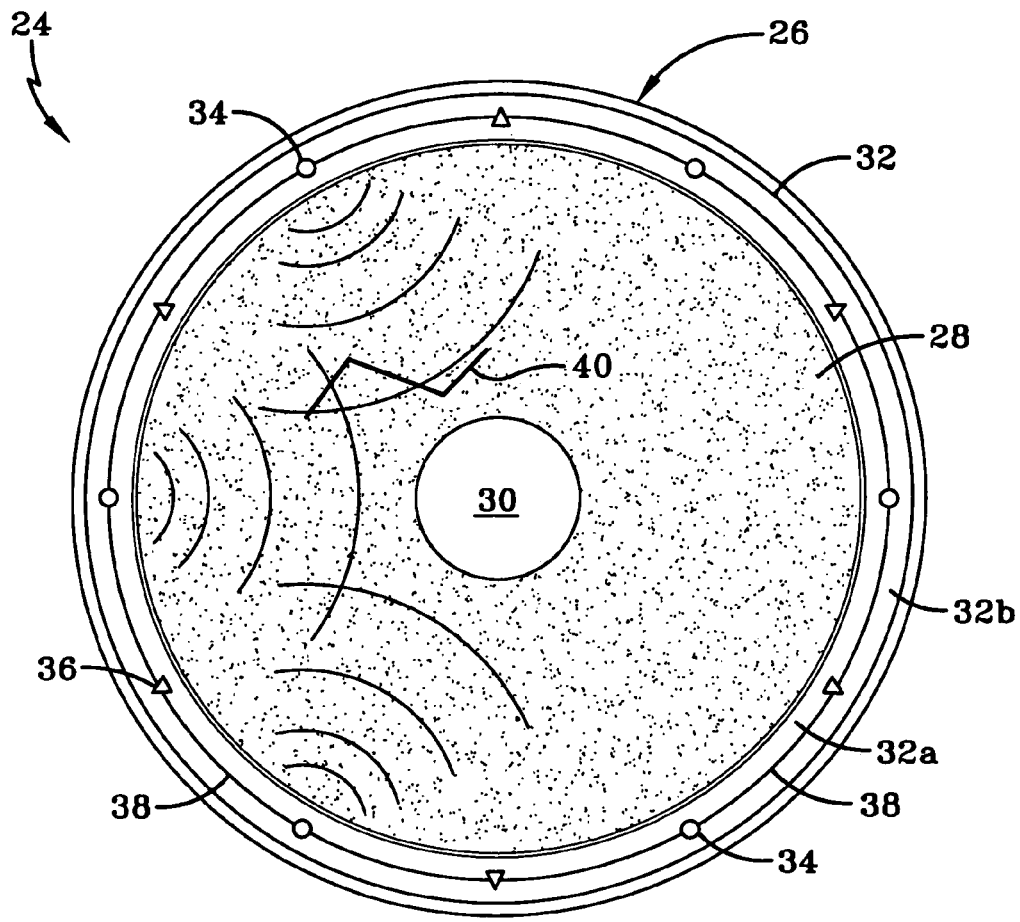
FIG. 2 is an axial cross section through a rocket motor illustrating an embodiment of the invention.

FIG. 2 is an axial cross-sectional view of a solid rocket motor 24. Solid rocket motor 24 includes an outer casing 26, made of, for example, metal. Disposed inside of casing 26 is propellant 28. An internal central bore 30 in the propellant 28 allows the propellant 28 to burn. Positioned between the casing 26 and propellant 28 is a protective liner 32, made of, for example, an elastomeric material, such as rubber.

Embedded within the liner 32 are an array of transmitter elements 34, and an array of receiver elements 36 alternately arranged with the transmitter elements 34. The transmitter elements 34 and receiver elements 36 are carried by a flexible sheet 38, which divides the liner 32 into inner and outer halves 32*a* and 32*b*, respectively.

In operation, the transmitter elements 34 are energized, either all together or in a predetermined sequence, to transmit RF energy into the propellant 28. Upon encountering a defect 40, the RF signal is altered and then received at various receiver elements 38. By analyzing the output of the receiver elements 38, the defect 40 may be detected.

Figure 3:
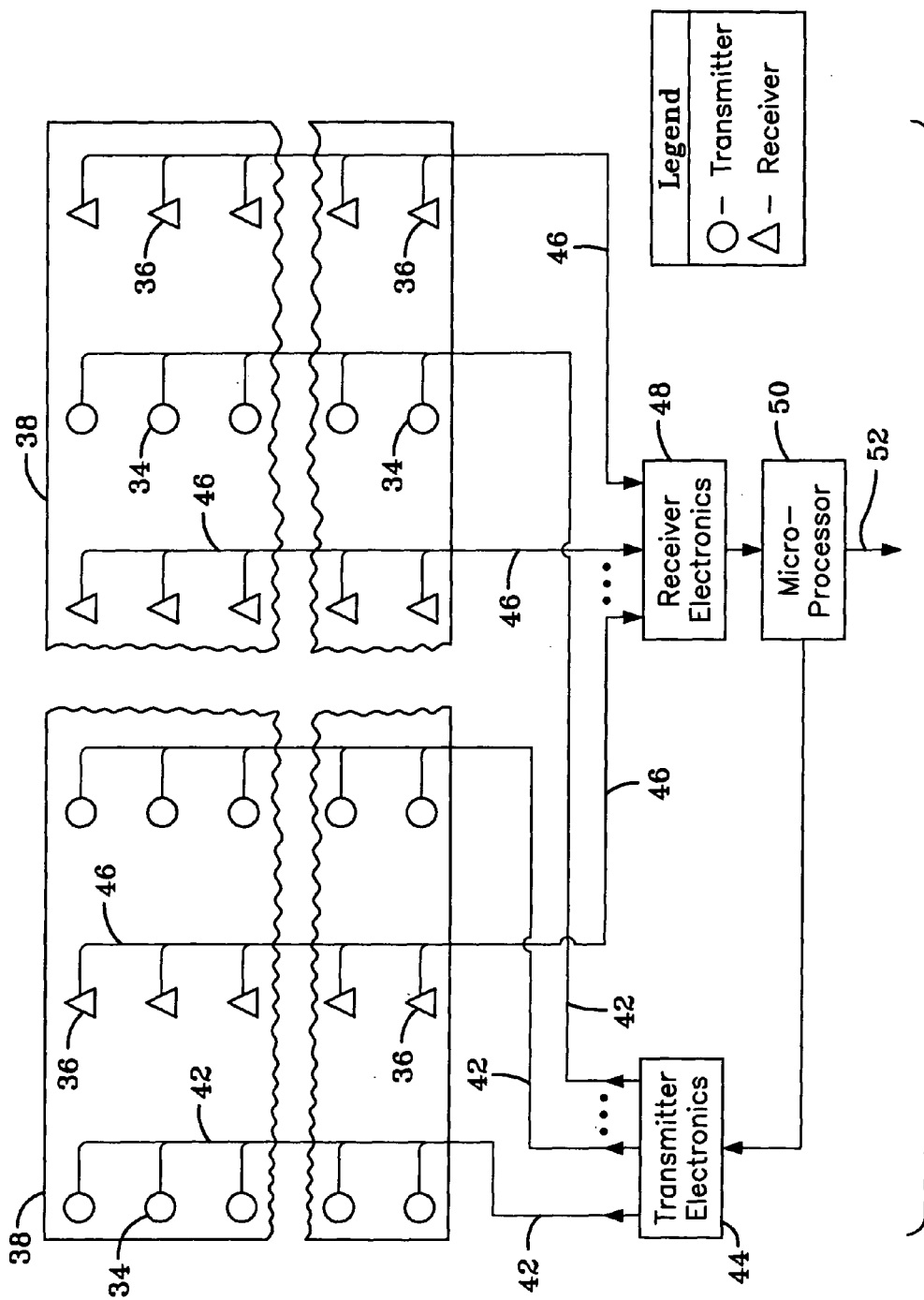
FIG. 3 illustrates an array of transmitter and receiver elements, together with transmitter and receiver electronics.

FIG. 3 illustrates the transmitter elements 34 and receiver elements 36 contained in or on sheet 38. In one exemplary embodiment, the sheet 38 may be of a plastic material, such as Mylar. The transmitter elements 34 and the receiver elements 36 may be, for example, adhesively attached to the sheet 38, or the elements may be deposited on the sheet 38 by a chemical vapor deposition process. The transmitter electronics 44 supply transmit signals via wiring bundles 42 to the transmitter elements 34. Similarly, wiring bundles 46 conduct receiver signals from the receiver elements 36 to the receiver electronics 48.

A microprocessor 50 controls the transmission sequence and is also operable to perform an analysis of the received signals by any one of a number of well-known tomographic image reconstruction algorithms. The output 52 of microprocessor 50 is provided to a utilization device (not illustrated) which will display or otherwise pinpoint the defect.

Figure 4:
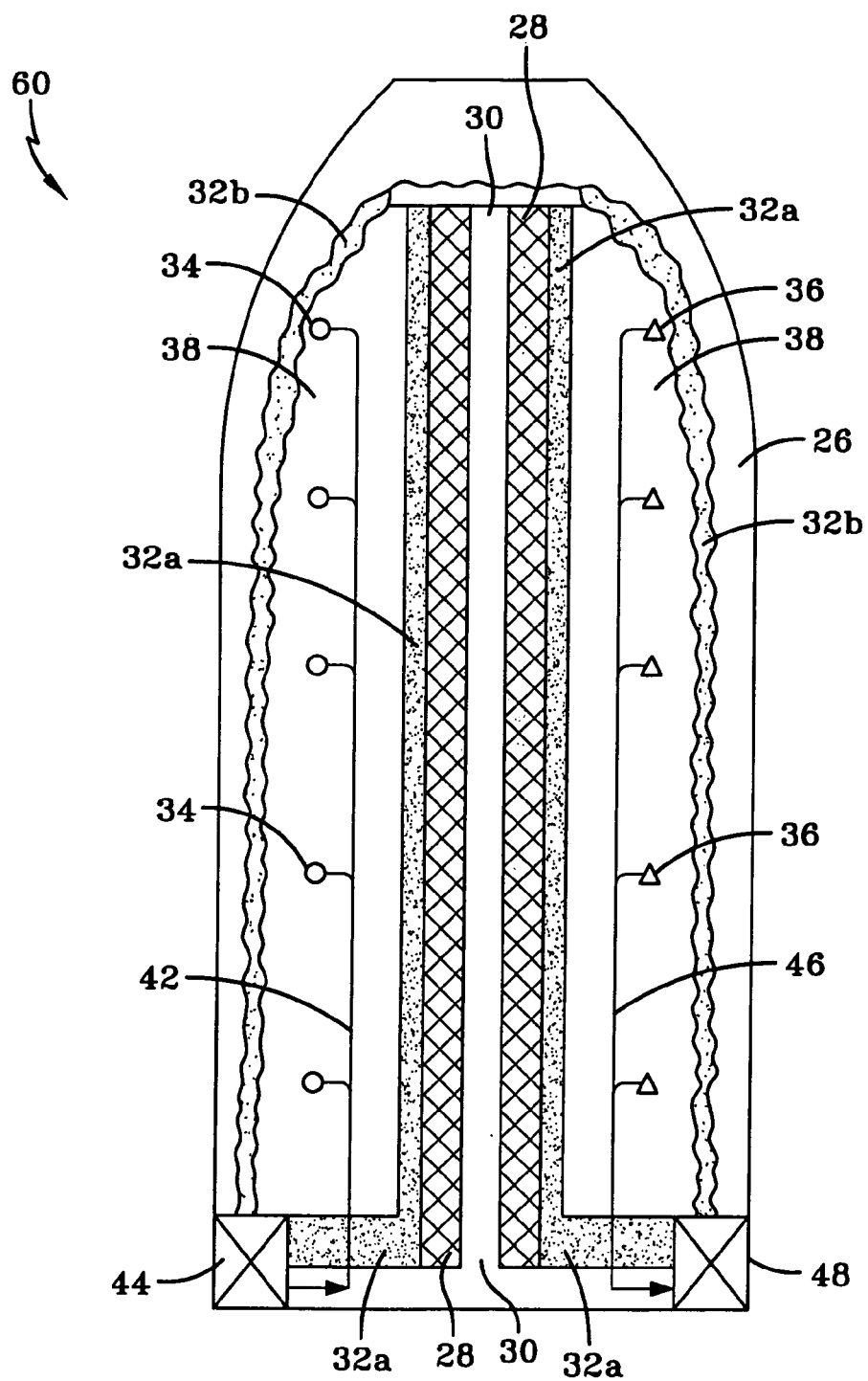
FIG. 4 is a partially cut away sectional view of a solid rocket motor in accordance with one aspect of the invention.

FIG. 4 is a partially cut away sectional view, illustrating a solid rocket motor assembly 60. Sheet 38 may be sandwiched between liner halves 32a and 32b. Transmitter and receiver electronics 44 and 48 may be disposed within the liner 32 at the lower portion of the casing 26. When testing for defects, the microprocessor 50 may be brought to the location of the stored rocket motor assembly 60, plugged into the transmitter and receiver electronics 44, 48, and a test commenced. The solid rocket motor assembly 60 need not be removed from its stored location. Alternatively, each solid rocket motor assembly 60 may include its own microprocessor 50.

It will be understood that many additional changes in the details, materials, steps and arrangement of parts, which have been herein described and illustrated in order to explain the nature of the invention, may be made by those skilled in the art within the principle and scope of the invention as expressed in the appended claims.

Any numerical parameters set forth in the specification and attached claims are approximations (fore example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. An apparatus for detecting defects in a propellant contained within a casing, comprising:

a liner being disposed between said propellant and said casing;

an array of RF transmitter elements and RF receiver elements being disposed within said liner and surrounding said propellant, wherein said propellant is a solid rocket motor propellant; and a flexible sheet surrounding said propellant, wherein said RF transmitter elements and said RF receiver elements are disposed on said flexible sheet, and wherein said RF receiver elements are alternately arranged with said RF transmitter elements around said propellant.

2. The apparatus of claim 1, further comprising transmitter electronics for providing said RF transmitter elements with a transmit signal; and receiver electronics for receiving output signals from said RF receiver elements.

3. The apparatus of claim 2, wherein said transmitter electronics and said receiver electronics are contained within said casing, and wherein said casing is a rocket casing.

4. The apparatus of claim 1, wherein said liner comprises an elastomeric material.

5. The apparatus of claim 2, further comprising a microprocessor for processing said output signals for providing an indication of defects within said propellant.

6. The apparatus of claim 1, wherein said RF transmitter elements and said RF receiver elements are adhesively attached to said flexible sheet.

7. The apparatus of claim 1, wherein said RF transmitter elements and said RF receiver elements are deposited on said flexible sheet by chemical vapor deposition.

8. The apparatus of claim 1, wherein said flexible sheet is disposed in said liner.

* * * * *